No. 670,297. Patented Mar. 19, 1901.
H. RITTENHOUSE.
RAILROAD TRACK GAGE.
(Application filed Sept. 4, 1896.)
(No Model.) 2 Sheets—Sheet 1.
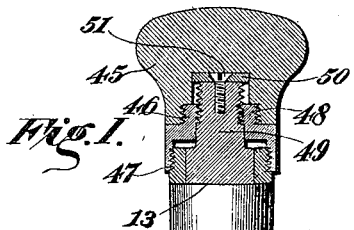
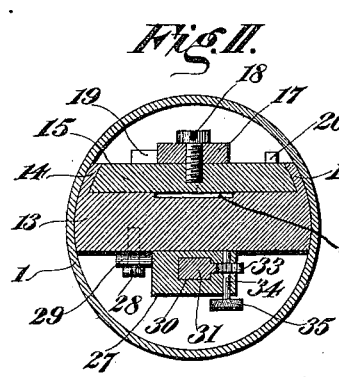
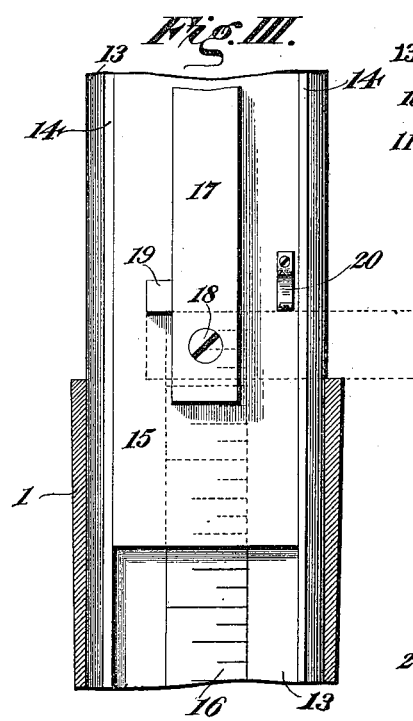
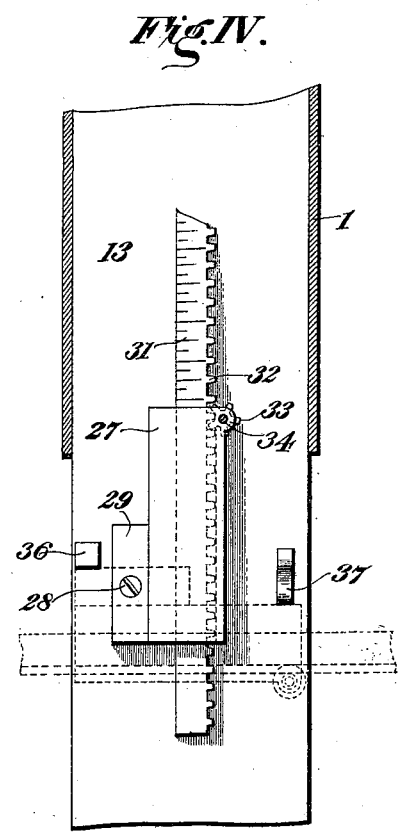
Witnesses
M. E. Fowler
A. E. Grant
Inventor
Harvey Rittenhouse
By Joseph H. Atkins
Attorney
THE NORRIS PETERS CO., PHOTO-LITHO., WASHINGTON, D. C.

No. 670,297. Patented Mar. 19, 1901.
H. RITTENHOUSE.
RAILROAD TRACK GAGE.
(Application filed Sept. 4, 1896.)
(No Model.) 2 Sheets—Sheet 2.
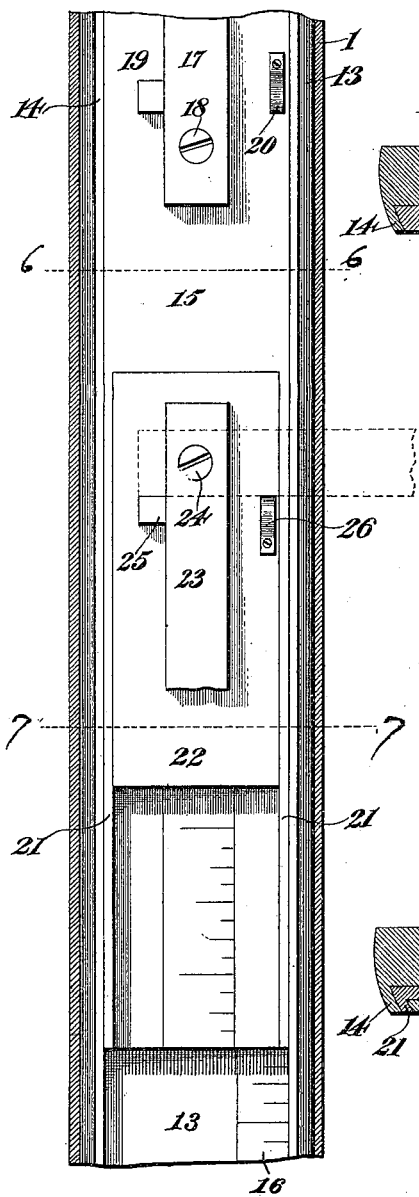
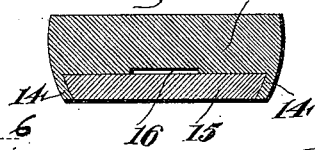
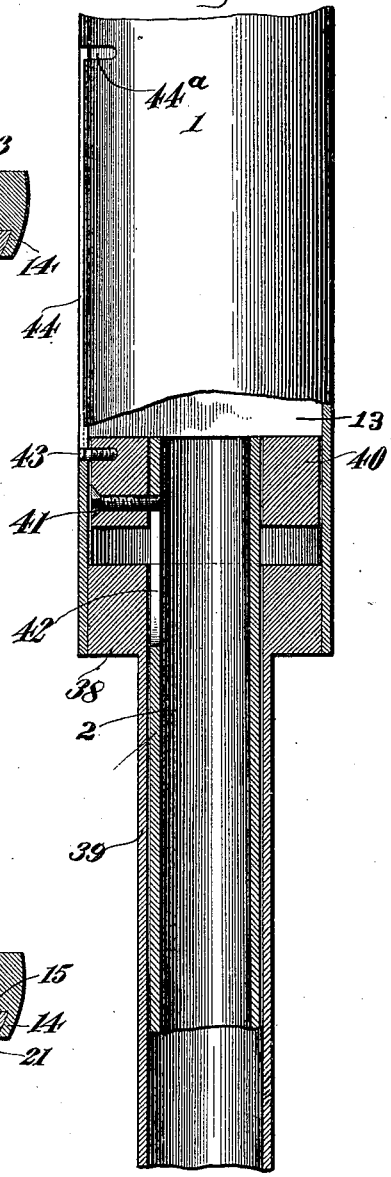
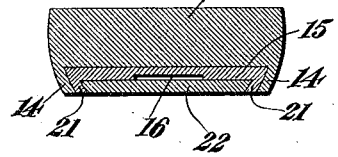
Witnesses
M. E. Fowler
A. E. Grant
Inventor
Harvey Rittenhouse,
By Joseph T. Atkins,
Attorney

UNITED STATES PATENT OFFICE.

HARVEY RITTENHOUSE, OF WINSTON, NORTH CAROLINA.

RAILROAD-TRACK GAGE.

SPECIFICATION forming part of Letters Patent No. 670,297, dated March 19, 1901.

Application filed September 4, 1896. Serial No. 604,850. (No model.)

*To all whom it may concern:*

Be it known that I, HARVEY RITTENHOUSE, of Winston, in the county of Forsyth, State of North Carolina, have invented certain new and useful Improvements in Railroad-Track Gages, of which the following is a complete specification, reference being had to the accompanying drawings.

The object of my invention is to produce a complete and accurate railroad-track gage the parts of which are so united as to form a compact, accurate, light, and portable measuring instrument.

My device is designed to be employed for ordinary measuring purposes or as a neat and compact instrument for use in track inspection, for which purpose I prefer to construct it of light material in imitation of a walking-cane.

In the accompanying drawings, Figure I is a side elevation of my instrument as constructed in imitation of a walking-cane with the head, middle, and lower parts in section. Fig. II is a section on the line 2 2 of Fig. I. Fig. III is a side elevation of a portion of my instrument with the tongue extended and the case shown in cross-section, the gage-arm being shown folded in full lines and set in position for use in dotted lines. Fig. IV is a view corresponding to Fig. III, but taken from the opposite side and showing the mechanism for measuring elevations in full lines folded and in dotted lines set as in use. Fig. V is a longitudinal section of the case and the tongue in elevation, showing the addition to the tongue of mechanism for measuring guard-rail distances. Fig. VI is a section on the line 6 6 of Fig. V. Fig. VII is a section on the line 7 7 of Fig. V. Fig. VIII illustrates a preferred method of assembling the tubes of my instrument for inclosure in a tapered case in imitation of a walking-cane.

Referring to the numerals on the drawings, 1 indicates the outer-shell case or frame-piece of my instrument, which is preferably externally tapered, but internally tubular to accommodate a telescoping tube 2, this construction being clearly illustrated in the middle sectional portion of Fig. I. The relative shapes of the parts 1 and 2, and particularly the externally-tapered form of the case 1, are merely features preferred for neatness of appearance, the essential relation of the parts 1 and 2 being that of two members movably united in such manner or by such means as to render them as a united whole longitudinally extensible.

When the case 1 is made of tubular form, and particularly when it is externally tapered, I prefer to provide the lower end thereof with a solid extension 3, the parts being united as by screw-threads shown in Fig. I. The piece 3 is provided with a recess 4 to accommodate a gage-finger 6, which being pivoted, as indicated at 5, is adapted to work upon its pivot in and out of the recess 4 like a jackknife, a recess 8, constituting a terminal enlargement of the recess 4, being provided for the working of the short end 7 of the finger 6.

The case 1, as illustrated in Fig. I, being intended to adapt my instrument for use as a walking-cane, I prefer to provide it with a wearing-tip 9, which may be screwed into the end of the piece 3, as illustrated in Fig. I.

The parts 1 and 2 being relatively movable in the manner above described, it is desirable to fix the limits of such movement, which may be accomplished by the employment of a screw 10, screwing into the part 1 and entering a slot 11 in the part 2. Any other ordinary means for limiting relative movement may of course be substituted for those specified.

The telescoping of the parts 1 and 2 affords a preferred means for preserving their coaxial alinement when the instrument is extended; but to accommodate within the case 1 the members of the instrument which render it available as a track-gage I prefer to shape that end of the tube 2 which is drawn out of the case 1 when it is extended in the form of a flat tongue 13, which, while, as shown in Fig. II, it fits snugly within the case 1 upon two opposite sides, upon the sides at right angles thereto leaves space for the accommodation within the case 1 of the members which it carries, as hereinafter specified. The tongue 13 is provided on one of its flat sides with opposite flanges 14, which define a dovetail track for the accommodation of the longitudinal movement of a strip 15, that works therein. In the face of the tongue 13, over which the strip 15 slides, I provide a series of graduations which for convenience of designation in the claims may be termed a "graduated scale" 16. Said graduations, in order that they may not become obliterated by abrasion occasioned by the sliding back and forth of the strip 15 upon the tongue 13, are preferably located in a longitudinal depression in the tongue 13, as clearly indicated in the cross-section illustrated in Fig. II. Upon the outer face of the strip 15—that is to say, its face opposite to that which works against the face of the tongue 13—I provide a gage-arm 17, which is pivoted to the strip 15, as upon a screw 18. It is adapted to be folded parallel to the strip 15, as shown in full lines in Fig. III, when the instrument is to be closed or to be turned at right angles thereto, as shown in dotted lines in Fig. III, when the instrument is being used as a track-gage. For fixing the arm 17 in its folded and working positions above described, respectively, I provide suitable stop mechanism, consisting, preferably, of a lug 19, projecting from the strip 15 in the path of the arm, so that when the arm is folded, as shown in full lines in Fig. III, it lies against the lug, and when the arm is turned at right angles to the strip 15 its short end impinges against the lug. The lug therefore serves to limit the movement of the arm 17 in one direction. To prevent its movement in the opposite direction, I provide a depressible spring 20, which when the short end of the arm 17 impinges the lug 19 engages the arm upon the opposite side of its pivot-screw 18 and holds it in position at right angles to the strip 15 until the operator depresses the spring 20, so that the arm 17 may be swung back over the spring into its folded position. The spring is so disposed as to enable it normally to engage the edge of the arm 17 or to be depressed, so that the arm may swing over it.

To accommodate my instrument for measuring the distance between the guard-rails and main rails, as well as between the main rails which constitute a railroad-track, it is sufficient to provide, in addition to the gage-arm 17, another gage-arm adjustable endwise of the instrument independently of the arm 17. A preferred form of embodiment of this amplification of my gage is shown in Figs. V to VII, inclusive, of the drawings, in which the independent endwise adjustment of the second gage-arm is provided for by forming the strip 15 with flanges 21, which form a dovetail track in the strip 15 for a guard-rail strip 22, so that the guard-rail strip 22 and the strip 15 are relatively assembled precisely in the same manner as the tongue 13 and strip 15 are assembled. Guard-rails being located in comparatively close proximity to the main rails, it is practicable to limit the movement of the guard-rail strip to bounds imposed by the longitudinal extent of the strip 15, its movement in one direction being determined by the location upon the strip 15 of the arm 17, beyond which it is unnecessary for the guard-rail strip 22 to pass.

As was above suggested, the office of the guard-rail strip is to afford means of adjustment for a second gage-arm. It is therefore provided with a guard-rail gage-arm 23, pivoted to the strip 22, as upon a screw 24. The strip 22 is also provided with a stop-lug 25 and a spring 26, corresponding in their respective relations and offices regarding the arm 23 to the lug 19 and spring 20, above described with respect to the arm 17, whose positions they are designed to fix.

Whether the tongue 13 be provided with one strip 15 or with two strips 15 and 22, it is adapted to accommodate within the case 1, upon its side opposite to that which carries said strip or strips, mechanism for measuring elevations, with which also it is preferably provided. Such mechanism being designed to indicate differences in degrees of respective elevations of the opposite ends of the instrument, it must comprise an elongated member movable at right angles to the axis of the instrument; but to accommodate such mechanism to the compass of a case, such as the case 1, the elongated member must be susceptible of disposition endwise of the case 1, or, which is the same thing, of the tongue 13. To provide such mechanism and to accommodate it to the conditions specified I prefer to employ a socket-piece 27, pivoted to the tongue 13, as upon a screw 28, which preferably passes through a wing 29 of the socket-piece. (Compare Figs. II and IV.) The socket-piece is preferably provided with a longitudinal track or bearing-aperture 30, within which works a graduated bar 31, preferably, but not necessarily, square in cross-section. As a means for adjusting the position of the bar 31 with respect to the socket-piece 27, so that it may be adapted to raise and lower the end of the gage which carries it, I provide suitable mechanism for lifting it longitudinally back and forth through the bearing-aperture 30. Such mechanism preferably consists of a rack 32, consisting of a succession of teeth in one face of the bar 31. With these teeth meshes a pinion 33, which, carried upon a shaft 34, mounted in the socket-piece 27, may be manipulated by means of a thumb-wheel 35, secured to the shaft.

The socket-piece 27 being designed to afford means for folding the bar 31, as shown in full lines in Fig. IV, or to set it in the operative position, as shown in dotted lines in that figure, I provide means for holding it accurately when required in the operative position. Such means may be substantially the same as those employed for setting the gage-arms above described. As such they comprehend a lug 36, projecting from the tongue 13 in the path of movement of the socket-piece 27 on one side of its pivot-screw 28 and a depressible spring 37, adapted to engage the socket-piece on the other side of its pivot-screw. The thumb-wheel 35 is designed to afford means for elevating and depressing the end of the gage to which the bar 31 is attached by means of the movement of the bar through its bearing-aperture 30.

As was above specified, it is essential in instruments of this kind, especially when composed of telescopic tubes, to preserve the axial alinement of the tubes. In Fig. I of the drawings an internally-tubular externally-tapered case is shown; but the externally-tapered feature, as has been specified, is non-essential, and in Fig. VIII, I illustrate a preferred form of case composed of tubes of different diameters, it being unnecessary to make the tube of equal diameter throughout. In its upper end the tube must be of sufficient size to accommodate the tongue 13; but in its lower end its only function is to accommodate a telescoping tube for preserving the axial alinement of the tongue 13 with the case when the former is drawn out of the latter. The form of case illustrated in Fig. VIII may be fashioned of externally-tapered form, after the manner of the case shown in Fig. I; but the illustration in Fig. VIII is designed for no other purpose than to show suitable mechanism for preserving the axial alinement of the two telescoping tubes of different diameters. Referring, accordingly, to Fig. VIII, 38 indicates a ring or heavy annular flange upon the end of the tube 39. It is provided for the purpose of fitting within the larger diameter of the tube 1. Within the tube 39 I provide the internally-telescoping tube 2, upon the end of which that enters the case 1 is movably secured a ring 40, as by means of a set-screw 41, working in the slot 42. The ring 40 is provided as a means of stiffening the instrument when the tongue 13, which is attached to it, is drawn out full length.

Limits of movement of the tube 2 within the case 1 are imposed by the employment of a slit 44 in the latter, within which works a pin 43, set in the ring 40. The slit 44 is preferably provided at its upper end with a pocket or transverse section 44$^a$, into which the pin 43 may be turned by manipulation of the tongue 13 after it is drawn out of the case 1, so that when so drawn out it may be held in a fixed extended position until ready to be returned into the case.

For drawing the tongue 13 out of the case 1 when required I prefer to provide upon the tongue a head 45, which may be shaped like the head of a walking-cane. (See Fig. I.) This head is screwed, as indicated at 46, to an intermediate annular connection 48, which has a depending apron 47, that is threaded to fit the threaded end of the case 1. The connection 48 is internally threaded to fit the externally-threaded reduced end 49 of the tongue 13. The end 49 is surmounted by a cap 50 of larger diameter than the end 49, and which being secured in place, as by a screw 51, screwed into the end 49, is accommodated in the hollow in the head 45. The screw-threads indicated at 46 and those with which the apron 47 and case 1 are provided are cut in opposite directions, so that the part 48 may be separated from the case without separating it from the head 45. The threads which unite the part 48 to the reduced end 49 of the tongue 13 are employed, so that the part 48 may ride up and down on the reduced end 49 when the head is being unscrewed from the case 1, but still retain its hold on the tongue 13 by positive and constant connection.

In operation the head 45 is unscrewed from the case 1 and the tongue 13 pulled out therefrom to the full extent, in which position the position of the parts may be fixed by turning the pin 43 into the pocket 44$^a$ if the construction illustrated in Fig. VIII is employed; otherwise the friction between the telescoping parts may be relied upon to keep the members in fixed relative positions. If when the instrument is extended as described the operator desires to gage the distance between the main rails of a track, he opens the finger 6 and sets the gage-arm 17 in the position illustrated in dotted lines in Fig. III. Then by sliding the strip 15 upon the tongue 13 he can gage the distance, which will be accurately indicated upon the scale 16, the scale being of course constructed with due regard to the relations of the several parts.

If the instrument be equipped with the arm 24 in addition to the arm 17, that may be utilized by setting it in the position illustrated in dotted lines in Fig. V and manipulating its strip 22 to fix the relative location of a guard-rail. Since the arms 17 and 24, with the strips by which they are adjusted and the scales by which such adjustment is measured, are designed only to measure relative locations, it is obvious that if the guard-rail be on the outside of the main rail the arm 24 may be utilized to measure the distances between the main rails and the arm 17 be employed to determine the location of the guard-rail. In other words, the terms "gage-arm" and "guard-rail gage-arm" are merely conventional names for the identification of the members to which in this specification they are appropriated.

For measuring elevations the instrument, which, as usual in such cases, is of course provided with a spirit-level tube, is set across the tracks whose relative elevations are to be determined, one end being secured against one track by means of the finger 6 and the end of the bar 31 being set upon the other track. Then by manipulating the thumb-wheel until a level is indicated the graduations upon the bar 31 will indicate in degrees the difference between the levels of the two tracks.

What I claim is—

1. In a track-gage the combination with a frame-piece provided with a movable tongue, of a sliding strip upon the tongue, and a movable gage-arm upon the strip, substantially as set forth.

2. In a track-gage the combination with a frame-piece and graduated movable tongue, of a sliding strip upon the tongue, a movable gage-arm upon the strip, and stop mechanism for limiting the movement of the gage-arm, substantially as set forth.

3. In a track-gage the combination with a frame-piece and tongue, of a strip movable longitudinally upon the tongue, and a gage-arm pivotally movable upon the strip, substantially as set forth.

4. In a track-gage, the combination with a frame-piece provided with a graduated tongue, of a movable graduated strip upon the tongue, a second strip movable upon the first-named strip, and gage-arms movable upon the strips, substantially as specified.

5. In a track-gage the combination with a frame-piece provided with a graduated tongue, of a graduated movable strip upon the tongue, a second movable strip upon the graduated strip, and folding gage-arms upon the strips, substantially as specified.

6. In a track-gage the combination with a pair of telescoping tubes the inner of which is provided with a tongue of a longitudinally-movable strip upon the tongue and a folding gage-arm upon the strip, substantially as specified.

7. In a track-gage the combination with a pair of telescoping tubes the inner of which is provided with a tongue of a plurality of longitudinal strips upon the tongue and folding arms upon said strips respectively, substantially as specified.

8. In a track-gage the combination with a frame-piece provided with a tongue, of a pivotally-movable socket-piece, and a measuring device carried by the socket-piece, whereby the movement of the socket-piece throws the measuring device in lines parallel or at right angles respectively, to the longitudinal axis of the tongue, substantially as set forth.

9. In a track-gage, the combination with a frame-piece and tongue, of a pivotally-movally socket-piece upon the tongue a measuring device carried by the socket-piece, and stop mechanism for limiting the pivotal movement of the socket-piece, substantially as set forth.

10. The combination with a frame-piece provided with a tongue, of a socket-piece movably secured to the tongue, a graduated bar provided with a rack, in the socket-piece, and an adjustment-pinion also carried thereon substantially as specified.

11. In a track-gage the combination with a pair of telescoping tubes, the inner of which is provided with a tongue of a longitudinal measuring device upon one side of the tongue, and a transverse measuring device upon the opposite side thereof, substantially as specified.

12. In a track-gage the combination with telescoping members, of an intermediate member screwed upon the outer of said members, a head threaded to the intermediate member, the two series of threads being oppositely disposed, and means for movably securing the intermediate member to the inner member, substantially as specified.

In testimony of all which I have hereunto subscribed my name.

HARVEY RITTENHOUSE.

Witnesses:
G. C. VAN ZANDT,
R. B. STONE.